United States Patent [19]

Allen

[11] Patent Number: 4,657,672

[45] Date of Patent: Apr. 14, 1987

[54] IMMERSION TYPE WATER FILTER

[76] Inventor: Raymond A. Allen, 7513 Whitaker Ave., Van Nuys, Calif. 91406

[21] Appl. No.: 740,346

[22] Filed: Jun. 3, 1985

[51] Int. Cl.⁴ .............................................. C02F 9/00
[52] U.S. Cl. ...................................... 210/94; 210/169; 210/266; 210/283; 210/416.2
[58] Field of Search .................. 210/94, 169, 266, 283, 210/416.2

[56] References Cited

U.S. PATENT DOCUMENTS

| | | | |
|---|---|---|---|
| 2,676,921 | 4/1954 | Vansteenkiste | 210/416.2 |
| 3,662,889 | 5/1972 | Takarabe | 210/169 |
| 3,768,651 | 10/1973 | Streeter | 210/169 |
| 3,883,428 | 5/1975 | Waring | 210/94 |
| 4,051,032 | 9/1977 | Borchardt | 210/283 |
| 4,072,612 | 2/1978 | Daniel | 210/416.2 |
| 4,186,093 | 1/1980 | Willinger | 210/169 |
| 4,421,644 | 12/1983 | Gedye | 210/416.2 |

Primary Examiner—Ivars Cintins
Attorney, Agent, or Firm—Roger A. Marrs

[57] ABSTRACT

An enclosed filter is disclosed herein having an elongated container or housing composed of transparent material incorporating a plurality of adjacent filtering chambers separated by a mesh partition or grid. Filter material especially suited for removing chloramine occupies each chamber and pump apparatus is employed for drawing water through an open grid end of the housing through the chambers for existing via a discharge port in the pump apparatus.

1 Claim, 5 Drawing Figures

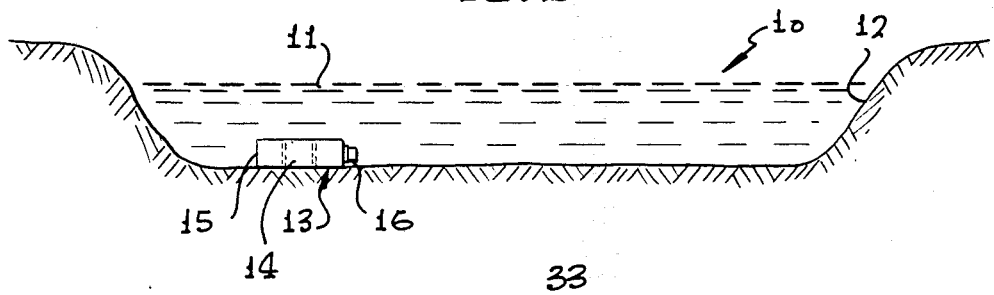
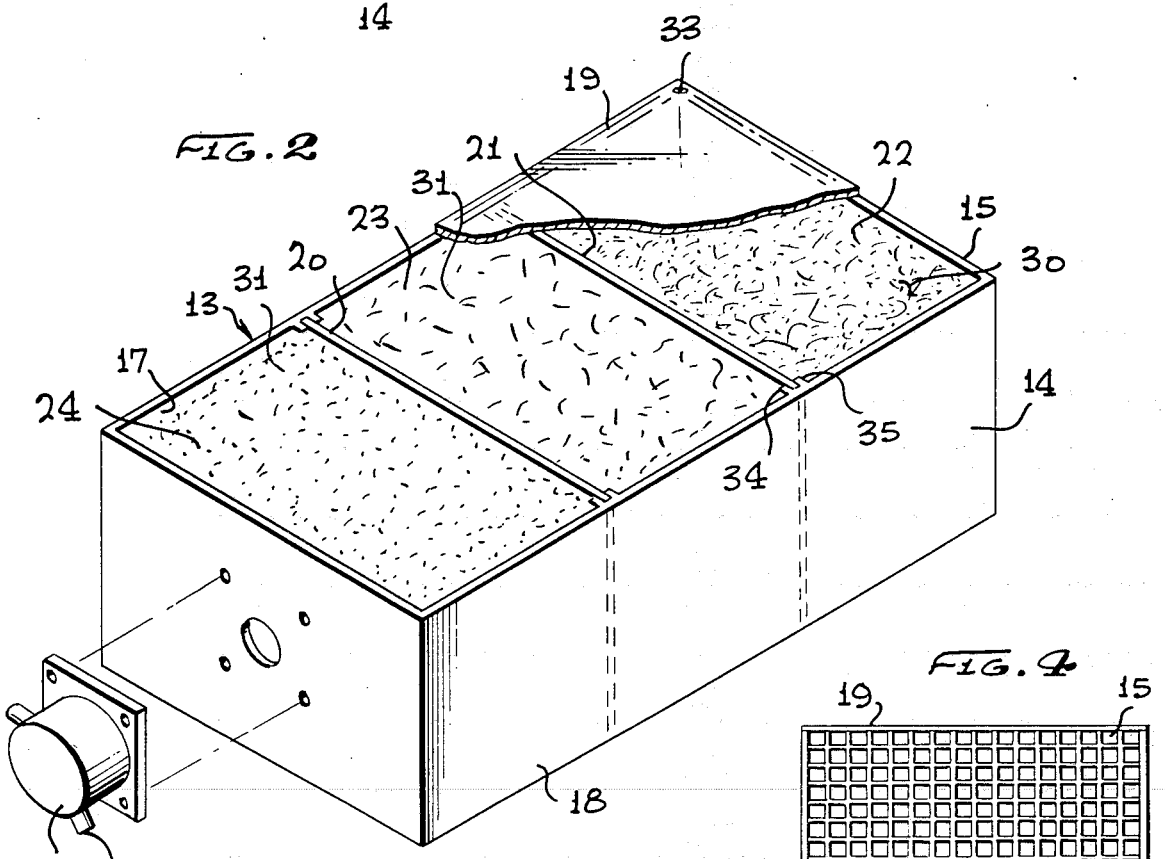
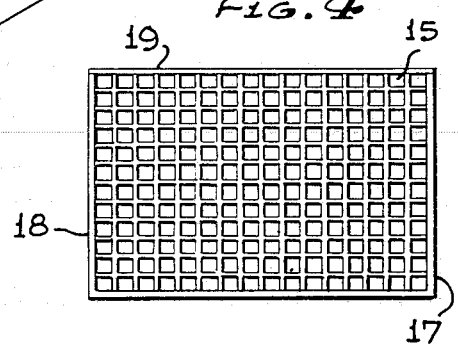
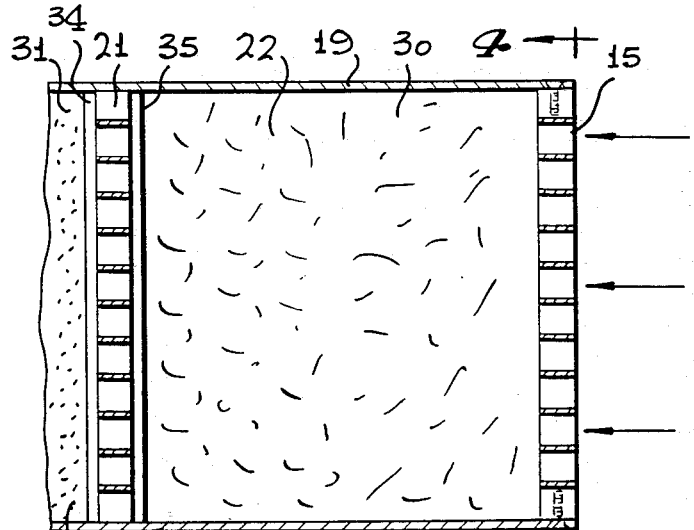
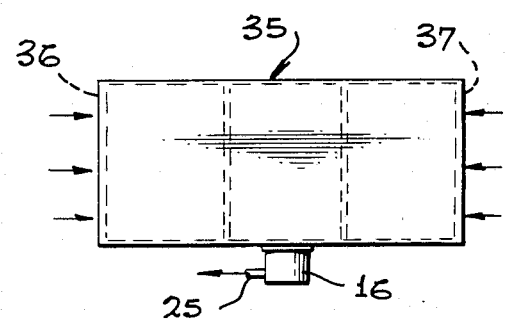

4,657,672

IMMERSION TYPE WATER FILTER

BACKGROUND OF THE INVENTION

1. Field of the Invention

The present invention relates generally to aquarium pools displaying and occupied by live fish and/or plants and, more particularly, to a novel immersible type water filter submerged in the pool for filtering selected biological and chemical compositions such as chloramines (chlorine and ammonia).

2. Brief Description of the Prior Art

In the past, it has been the conventional practice to place live fish into outdoor pools or ponds where the fish can be displayed. However, the water needs to be filtered continuously so that fish and plant life will be maintained properly. The pond water is replenished from a tap line source which generally includes a multiplicity of chemicals intended to sterilize and cleanse the water.

Although such chemicals are needed to cleanse water for human consumption, some of the chemicals such as chloramines are detrimental to fish and must be filtered out so that contamination of the water does not occur. Filters currently in use for cleansing such tap water do not eliminate chloramines from the water content and, therefore, fish and plant life are often killed when chloramines are not removed.

Therefore, a need has existed to provide an immersible filter capable of drawing surrounding water into a series of filtering materials so that chloramines are especially removed from the water composition.

SUMMARY OF THE INVENTION

Accordingly, the above problems and difficulties are obviated by the present invention which provides a novel immersible type tap water filter suitable for use in outdoor ponds which comprises a housing composed of transparent material having a series of spaced apart partitions or grids formed with an open mesh so as to permit water to flow therethrough. One end of the housing is composed of such a grid while the opposite ends supports a pump means for drawing pond water through the opposite end of the housing, through a plurality of chambers occupied by filtering materials and exiting the water through a port in the pumping means. In one form of the invention, the partitions separating the chambers may be removable for cleansing purposes and the lid of the housing may be readily detached for changing filter material occupied in the various filter chambers.

Therefore, it is among the primary objects of the present invention to provide a novel immersible type tap water filter which incorporates a plurality of spaced apart partitions having wide mesh openings so that the water will readily move between partitions without clogging the partition openings or substantially accumulating thereon.

Still another object of the present invention is to provide a novel immersible type filter for outdoor fish ponds and pools that is totally submersible and is effective for removing a variety of biological and chemical compositions contained in tap water and especially compositions of chlorine and ammonia normally referred to as chloramines.

Yet another object of the present invention is to provide a novel filtering means totally submerged in a fish pond for effectively removing chloramines from the water as it passes through the filter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a transverse cross-sectional view of a typical fish pond incorporating the submersible filter of the present invention;

FIG. 2 is a large perspective view of the novel filter used in the pool of FIG. 1;

FIG. 3 is a fragmentary sectional view of the filter shown in FIG. 2;

FIG. 4 is an end view to the entrance of the filter as taken in the direction of arrows 4—4 of FIG. 3; and FIG. 5 is a top plan view of another version or embodiment of the present invention.

DESCRIPTION OF THE PREFERRED EMBODIMENT

Referring to FIG. 1, a typical fish pond is illustrated by the arrow 10 which includes a body of water 11 confined in a cavity or depression 12 in the ground. The cavity may be lined with cement, plastic or the like so that the water will not normally seep into the earth. The body of water holds a quantity of plant life and live fish for display purposes and the novel filter of the present invention is indicated by numeral 13 which is totally submerged in the body of water and rests on the bottom of the cavity 12.

The filter 13 includes a housing 14 having an entrance 15 taking the form of a wide mesh partition through which water may enter the filter. The opposite end of the housing 13 includes a pumping means 16 for drawing water through the grid or open mesh wall 15 into the interior of the filter which then exits through a port in the pumping means 16 in the direction of the arrows indicated.

Referring now in detail to FIG. 2, the filter 13 includes sides 17 and 18 which are composed of a transparent material and a lid 19 which is also composed of a transparent material. Construction in this manner conceals the presence of the filter while it is at the bottom of the pool. FIG. 2 also illustrates that the housing encloses a plurality of filter chambers and each of the chambers is separated by an open mesh partition such as partitions 20 and 21. The partitions and, therefore, the chambers are arranged in a series adjacent to one another in side-by-side relationship so that the water will enter through the entrance grid 15 and progress through a first chamber 22, through the grid 21 into a second chamber 23, through the grid 20 into another chamber 24 and then through an exit port 25 in the pumping means 16. The pumping means is carried on the external surface of a wall 26 forming the end of the housing opposite to its end carrying entrance grid 15.

For removing chloramines from the pool or pond water, the chamber 22 is occupied with a filter floss material indicated in general by numeral 30 while chambers 23 and 24 are substantially occupied by pieces of Zelite or activated carbon.

Referring now in detail to FIG. 3, it can be seen that the openings in the partitions or grids 15, 21 and 20 are very wide so that foreign material will not collect thereon and cause a stoppage. Also, a substantial amount of water flow is guaranteed by the employment of wide openings in the walls and partitions so that the pumping means will readily pull a substantial amount of water through the filter. The activated charcoal or filter chunks or pieces of Zelite are indicated by numeral 31 in chambers 23 and 24.

FIG. 3 also illustrates that the lid 19 may be readily secured to the housing by means of screws such as screw 33 and that parallel and spaced apart guides 34 and 35 may readily secure partitions therebetween. For removal, the partition need be lifted so that it slides out of the slot formed between the adjacent rails of the guides.

In FIG. 4, the entrance 15 to the filter is illustrated which, again, emphasizes the wide mesh or wide openings available for drawing water into the filter.

Referring now to FIG. 5, another embodiment of the present invention is indicated by numeral 35 wherein both ends of the housing are provided with large mesh grids 36 and 37 and the pumping means 16 is located in the mid section of the housing. The pumping means also draws water from the filter at the mid compartment. Therefore, it can be seen that water enters both ends of the housing and exits through port 25 of the pumping means as previously indicated. However, by placing the activated charcoal or Zelite in the central compartment and placing the filter floss in the end compartments, the chloramines can be readily removed from the water as it passes through the water.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an out-of-doors aquarium or pond for holding and displaying live fish and plants, the combination which comprises:

an immersion filter submerged in the body of water intended to be filtered;

said filter including a housing of transparent composition having a mesh grid at one end and a pump means at its other end;

said filter further including a plurality of chambers including a middle chamber between the opposite ends of said housing separated by meshed partitions so as to allow water flow through said housing from said grid at one end to said pumping means;

water filtering material occupied in each of said chambers for removing chloramines from the water;

said filter material includes filter floss and activated carbon;

guide means for retaining said grids and said partitions in place to define said chambers;

said meshed partitions are composed of crossed plastic louvers forming a grill of unrestricted openings for the passage of water at the bottom of said housing;

said pump means is operably coupled to said middle chamber and includes a submerged motor.

* * * * *